US008868661B2

(12) United States Patent
Asawa et al.

(10) Patent No.: US 8,868,661 B2
(45) Date of Patent: Oct. 21, 2014

(54) MESSAGE MANAGEMENT BASED ON METADATA

(75) Inventors: Manjari Asawa, Cupertino, CA (US);
Jerry Kupsh, Concord, CA (US);
Brandie Roberts, Berkeley, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1291 days.

(21) Appl. No.: 12/247,422

(22) Filed: Oct. 8, 2008

(65) Prior Publication Data

US 2010/0088378 A1 Apr. 8, 2010

(51) Int. Cl.
*H04L 12/58* (2006.01)
*G06F 15/16* (2006.01)
*H04L 29/08* (2006.01)
*G06F 11/30* (2006.01)
*G06F 17/30* (2006.01)

(52) U.S. Cl.
CPC .............. *H04L 12/587* (2013.01); *G06F 15/16* (2013.01); *H04L 29/08711* (2013.01); *G06F 11/3086* (2013.01); *G06F 17/30997* (2013.01); G06F 2212/7207 (2013.01); H04N 2201/3229 (2013.01); H04N 2201/3228 (2013.01); *H04L 51/22* (2013.01); *H04L 51/24* (2013.01); *H04L 51/26* (2013.01)
USPC ...................................................... 709/206

(58) Field of Classification Search
CPC ............... G06F 15/16; G06F 11/3086; G06F 2212/7207; G06F 17/30997; H04L 29/08711; H04L 67/2804; H04L 2201/3229; H04N 2201/3228

USPC ......................................................... 709/206
See application file for complete search history.

(56) References Cited

U.S. PATENT DOCUMENTS

| 6,418,169 | B1 * | 7/2002 | Datari ...................... 375/240.28 |
|---|---|---|---|
| 7,711,880 | B2 * | 5/2010 | Fredriksson .................. 710/117 |
| 7,714,878 | B2 * | 5/2010 | Gabay et al. .................. 345/626 |
| 7,895,273 | B1 * | 2/2011 | Haldar .......................... 709/206 |
| 8,055,757 | B2 * | 11/2011 | Watkins ........................ 709/224 |
| 2003/0002681 | A1 * | 1/2003 | Fredriksson .................. 380/278 |
| 2003/0233419 | A1 * | 12/2003 | Beringer ....................... 709/206 |
| 2004/0164155 | A1 * | 8/2004 | Iwaguchi et al. ......... 235/462.08 |
| 2004/0254998 | A1 * | 12/2004 | Horvitz ......................... 709/206 |
| 2005/0152408 | A1 * | 7/2005 | Jeong et al. ................... 370/529 |
| 2005/0204001 | A1 * | 9/2005 | Stein et al. .................... 709/206 |
| 2005/0235034 | A1 * | 10/2005 | Chen et al. .................... 709/206 |
| 2005/0251411 | A1 * | 11/2005 | Ishii et al. ......................... 705/1 |
| 2006/0056394 | A1 * | 3/2006 | Kuure et al. ................... 370/352 |
| 2006/0153201 | A1 * | 7/2006 | Hepper et al. ............ 370/395.42 |
| 2007/0036301 | A1 * | 2/2007 | Voticky et al. .............. 379/88.22 |
| 2007/0226204 | A1 * | 9/2007 | Feldman ........................... 707/5 |
| 2007/0253412 | A1 * | 11/2007 | Batteram et al. .............. 370/389 |
| 2008/0046399 | A1 * | 2/2008 | Goodman et al. ................. 707/1 |
| 2008/0106416 | A1 * | 5/2008 | Sullivan et al. ............. 340/572.2 |

(Continued)

*Primary Examiner* — O. C. Vostal (57) ABSTRACT

A method includes receiving a message, determining at least one of a message importance level or a message delivery alert level based on one or more message characteristics associated with the message and generating metadata that indicates the at least one of the message importance level or the message delivery alert level with the message. The method further includes transmitting the message and the metadata toward a destination, receiving the message with the metadata, and providing notification and user interface indication corresponding to the at least one of the message importance level or the message delivery alert level or a storing of the message in an inbox folder corresponding to the at least one of the message importance level or the message delivery alert level.

20 Claims, 10 Drawing Sheets

(56) References Cited

U.S. PATENT DOCUMENTS

| | | |
|---|---|---|
| 2008/0133708 A1* | 6/2008 | Alvarado et al. ............. 709/218 |
| 2008/0154625 A1* | 6/2008 | Serbanescu ...................... 705/1 |
| 2009/0049078 A1* | 2/2009 | Gallagher et al. ............ 707/102 |
| 2009/0069037 A1* | 3/2009 | Gan et al. ...................... 455/466 |
| 2009/0094240 A1* | 4/2009 | Bordeaux et al. ................. 707/7 |
| 2009/0100080 A1* | 4/2009 | Toms et al. ................... 707/100 |
| 2009/0106605 A1* | 4/2009 | Kuchibhotla et al. ........... 714/47 |
| 2009/0172103 A1* | 7/2009 | Tuli ............................... 709/206 |
| 2009/0234850 A1* | 9/2009 | Kocsis et al. ..................... 707/6 |
| 2009/0327510 A1* | 12/2009 | Edelman et al. .............. 709/231 |
| 2010/0027834 A1* | 2/2010 | Spitzig et al. ................. 382/100 |
| 2010/0042570 A1* | 2/2010 | Mayers et al. .................. 706/46 |
| 2011/0029373 A1* | 2/2011 | Steelberg et al. .......... 705/14.41 |

* cited by examiner

MESSAGE MANAGEMENT BASED ON METADATA

BACKGROUND

Carriers now offer their subscribers the ability to receive various types of messages (e.g., short message service (SMS) messages, multimedia message service (MMS) messages, etc.) from various types of sources (e.g., a person, an application (e.g., a news flash), etc.). Typically, carriers utilize messaging platforms that just pass the messages on to the subscribers without regard to the importance or non-importance of the messages. Additionally, subscriber devices usually provide the same alert mechanisms (e.g., a message received alert) regardless of the importance or non-importance of the messages. Further, subscriber devices usually place these messages in the same message inbox.

DETAILED DESCRIPTION OF PREFERRED EMBODIMENTS

The following detailed description refers to the accompanying drawings. The same reference numbers in different drawings may identify the same or similar elements. Also, the following description does not limit the invention.

The concepts described herein relate to distinguishing between various types of messaging traffic and utilizing such information to determine an importance of a message and/or a relevance of a message to a user. For example, a network device may infer message importance and/or user relevance based on, for example, message source, message format, message originator, message recipient, message content, message application, keywords, short codes, and/or other message characteristics associated with the message. The network device may map this information (e.g., message importance, user relevance) to metadata to associate with the message. In turn, a user device may receive the message and use the metadata to provide to a user different alert mechanisms corresponding to the level of importance associated with the received message and/or provide different inboxes corresponding to the level of importance of the received message.

Figure 1:
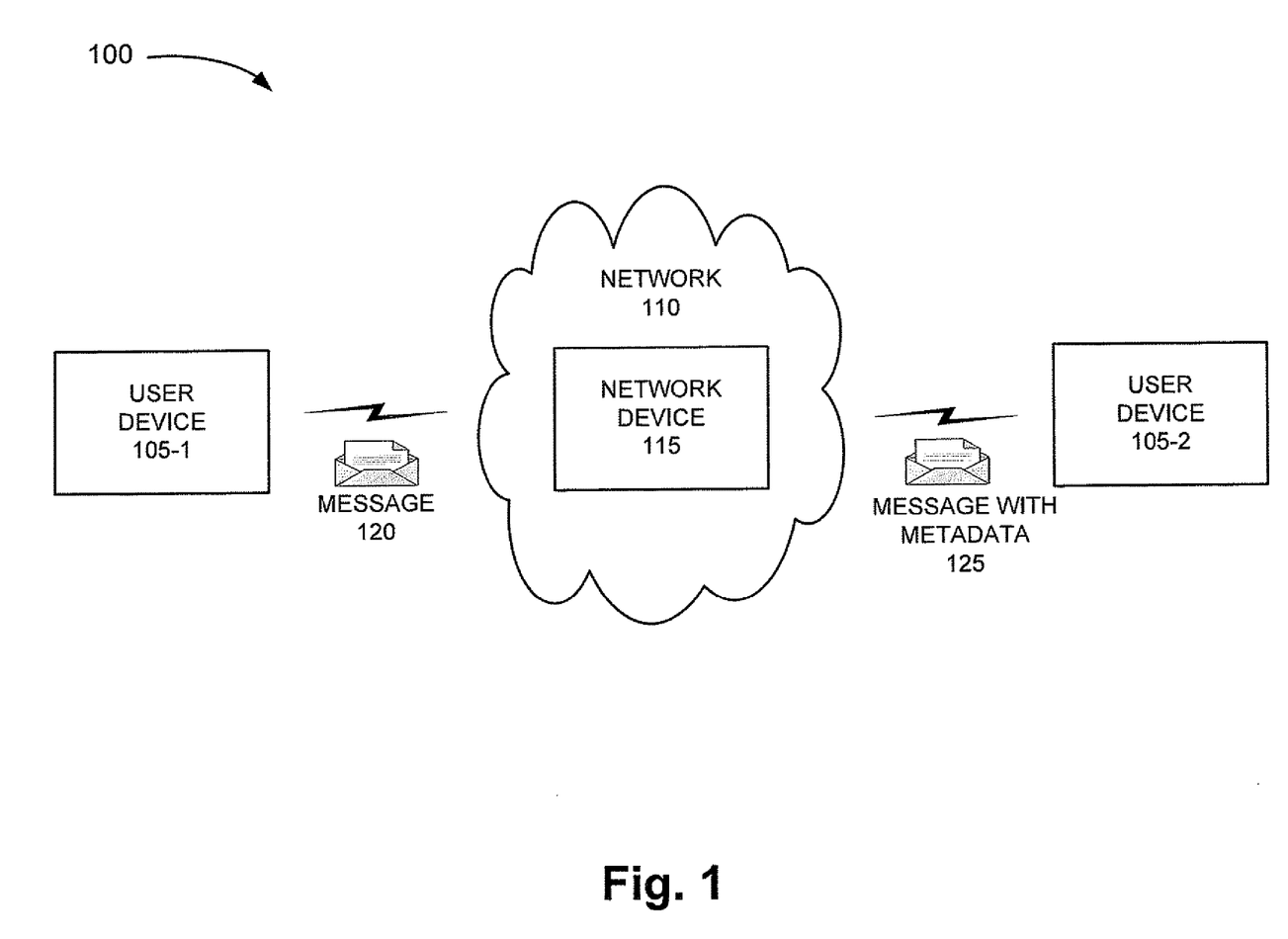
FIG. 1 is a diagram illustrating concepts associated with providing metadata that includes the importance and/or user relevance of a message based on message characteristics.

FIG. 1 is diagram illustrating concepts associated with providing metadata that includes the importance and/or user relevance of a message based on message characteristics. As illustrated, an exemplary environment 100 may include user devices 105-1 and 105-2, a network 110, and a network device 115. The devices in environment 100 may be communicatively coupled.

User devices 105-1 and 105-2 may each include, for example, a portable, a handheld, a mobile, or a stationary device having communication capability. For example, user devices 105-1 and 105-2 may each include a wireless telephone, a personal digital assistant (PDA), a web-browsing device, a computer, a pager, and/or some other type of computational and/or communicational device. User devices 105-1 and 105-2 may each include one or more messaging clients (e.g., a SMS client, a MMS client, an e-mail client, etc.).

Network 110 may include, for example, the Internet, an Intranet, a local area network (LAN), a wide area network (WAN), a telephone network (e.g., a Public Switched Telephone Network (PSTN), a wireless network, a wired network, and/or a combination of networks. Network 110 may provide message services for user devices 105-1 and 105-2.

Network device 115 may include an intermediate device between user device 105-1 and 105-2 having communication capability. For example, network device 115 may include a switch, a router, a gateway, a relay, a server, and/or some other type of communication device. Network device 115 may attach, associate, and/or include metadata with messages received from other devices, such as user devices 105-1 and 105-2. The metadata may include information that assigns an importance to a message and/or a user relevance to a message. Network device 115 may determine an importance of a message and/or a user relevance of a message based on, for example, message source, message format, message originator, message recipient, message content, message application, keywords, short codes, and/or other message characteristics associated with the message.

In an exemplary scenario, user device 105-1 may transmit a message 120 to user device 105-2 via network 110. For example, message 120 may correspond to a SMS message. Network device 115 may receive message 120 and infer a level of importance of message 120 based on, for example, the origination of the message, the content of the message, etc. Network device 115 may attach, associate, and/or include metadata with respect to received message 120 based on the inferred level of importance. The metadata may include, for example, information that assigns a level of alert (e.g., importance) of message 120 and/or a user relevance of message 120. Network device 115 may forward a message with metadata 125 to user device 105-2.

User device 105-2 may receive message with metadata 125. User device 105-2 may utilize the metadata for providing different levels of alerts to a user. That is, when message with metadata 125 is received, user device 105-2 may provide an alert to the user that corresponds to a user-configured alert setting or a default alert setting based on the metadata. Additionally, message with metadata 125 may be stored in an inbox of user device 105-2 that corresponds to the metadata.

For example, user device 105-2 may have inbox folders that correspond to different levels of importance and/or user relevance.

As a result of the foregoing, a network device may determine the importance and/or user relevance of messages destined to user devices and may provide this information to the user devices. In turn, user devices may provide alerts and/or inboxes that correspond to the importance and/or user relevance of received messages. In this way, user devices may better manage messages received. For example, as will be described below, different levels of alerts may provide a user with an indication that a message is important, time-critical, unimportant, or not critical. Further, a user may spend less time accessing messages when received messages are organized in separate inboxes corresponding to their level of importance, user relevance, etc. Since concepts have been broadly described in relation to FIG. 1, additional details will be described further below, as well as variations to the above concepts.

Figure 2:
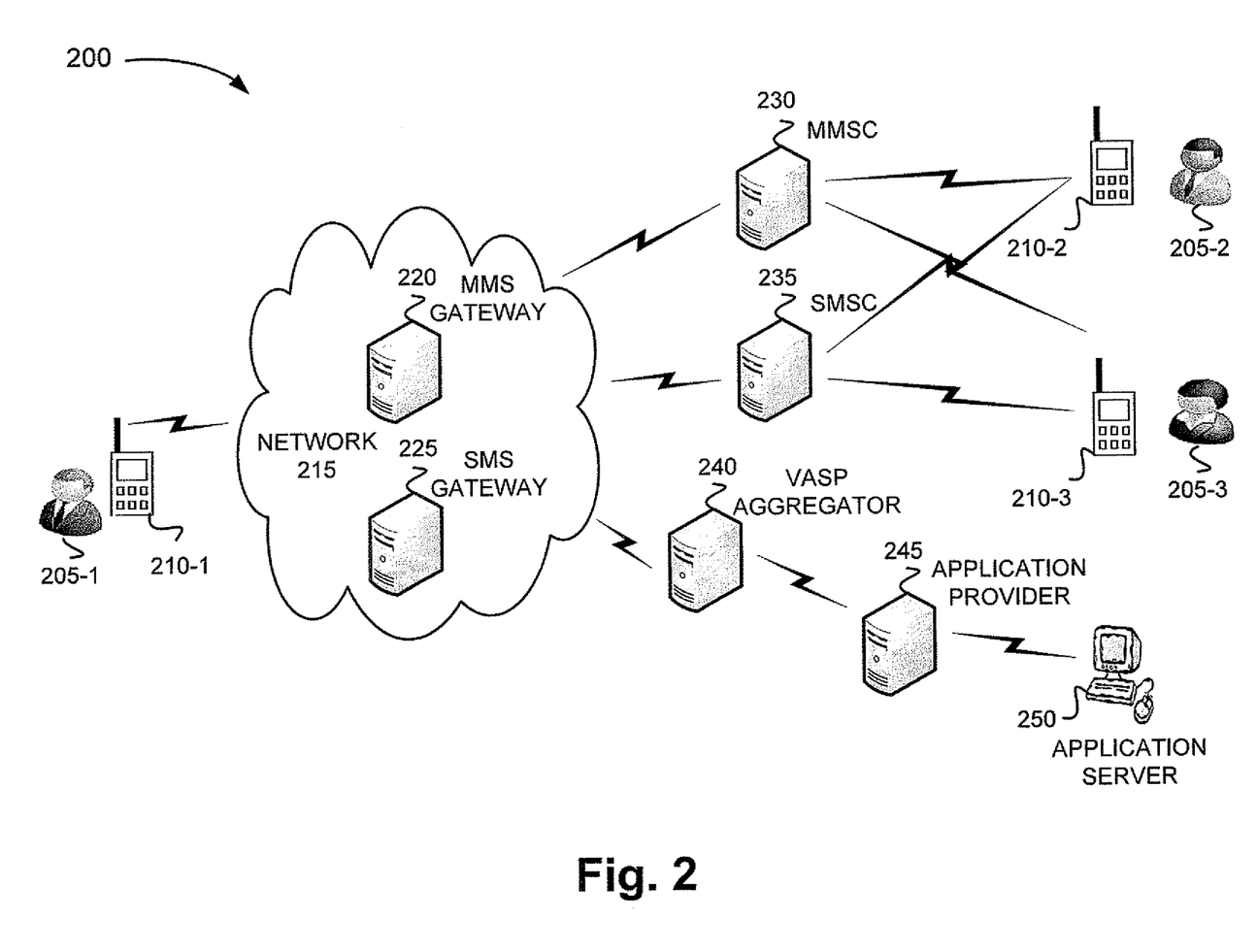
FIG. 2 is a diagram illustrating an exemplary environment in which concepts associated with providing and utilizing metadata that includes the importance and/or user relevance of a message may be implemented.

FIG. 2 is a diagram of an exemplary environment 200 where the message handling scheme may be implemented. As illustrated, FIG. 2 includes users 205-1, 205-2, and 205-3, user devices 210-1, 210-2, and 210-3, a network 215, a MMS gateway 220, a SMS gateway 225, a Multimedia Message Service Center (MMSC) 230, a Short Message Service Center (SMSC) 235, a Value-Added Service Provider (VASP) Aggregator 240, an Application Provider (AP) 245, and an Application Server (AS) 250. User devices 210-1, 210-2, and 210-3 may correspond to user devices 105, as previously described. Similarly, network 215 may each correspond to network 110. For purposes of discussion, MMS gateway 220 and SMS gateway 225 may respectively correspond to network device 115, as previously described.

MMS gateway 220 may include a device that supports MMS connectivity and processes MMS messages. MMS gateway 220 may switch messages between different MMS clients and between MMS and e-mail. MMS gateway 220 may include an MMS compiler to generate headers and message formats required for MMS content. MMS gateway 220 may support various protocols (e.g., Hypertext Transfer Protocol (HTTP), HTTP over Secure Socket Layer (HTTPS), MM1, MM1 over a Global System for Mobile Communication/General Packet Radio service (GSM)/(GPRS) modem, MM3, MM4, MM7, EAIF, etc.) and various MMS standards, such as, for example, Open Mobile Alliance (OMA), Wireless Application Protocol (WAP) Forum, $3^{rd}$ Generation Partnership Project (3GPP), etc.

SMS gateway 225 may include a device that supports SMS connectivity and processes SMS messages. SMS gateway 225 may switch messages between different SMS clients and between SMS and e-mail. SMS gateway 225 may support various protocols (e.g., Short Message Peer-to-Peer (SMPP), Computer Interface to Message Distribution (CIMD), Universal Computer Protocol/External Machine Interface (UCP-EMI), HTTP, HTTPS, GSM modems, etc.). SMS gateway 225 may set various SMS parameters, such as, for example, data coding scheme and validity period. SMS gateway 225 may support least cost routing and/or other types of routing features.

MMSC 230 may include a device that supports MMS connectivity and processes MMS messages. MMSC 230 may provide content adaptation and content conversion (e.g., images, audio, etc.) to assist in the process of delivering MMS content to different types of MMS clients. MMSC 230 may include a Simple Mail Transfer Protocol (SMTP) server to accept messages from Internet e-mail accounts. MMSC may support person-to-person MMS messaging, and/or application-to-person and person-to-application MMS messaging.

SMSC 235 may include a device that supports SMS connectivity and processes SMS messages. SMSC 235 may route SMS messages to recipients. SMSC 235 may operate according to a store-and-forward framework that delivers SMS messages to recipients based on the status of user devices 210 and/or network 215. SMSC 235 may support person-to-person SMS messaging, and/or application-to-person and person-to-application SMS messaging.

VASP aggregator 240 may include a device that provides or aggregates content (e.g., news, logos, ring tones, podcasts, blogs, etc) from various service providers, application providers and/or content providers. VASP aggregator 240 may connect to other devices in environment 200 using various protocols (e.g., MM4, MM7, EAIF, etc.). AP 245 may include a device that provides content, services and/or applications to VASP aggregator 240. AS 250 may include a device that stores and/or provides the actual content, application, and/or services.

Although FIG. 2 illustrates an exemplary environment 200, in other implementations, environment 200 may include additional, fewer, or different devices and/or networks. Additionally, or alternatively, the number of devices, the arrangement of the devices and/or the connections illustrated may be different in other implementations. For example, one or more of the devices in environment 200 may be combined into a single device. Additionally, or alternatively, it will be appreciated that one or more devices in environment 200 may be capable of performing one or more functions, operations, etc., that have been described as being performed by one or more other devices in environment 200.

Figure 3A:
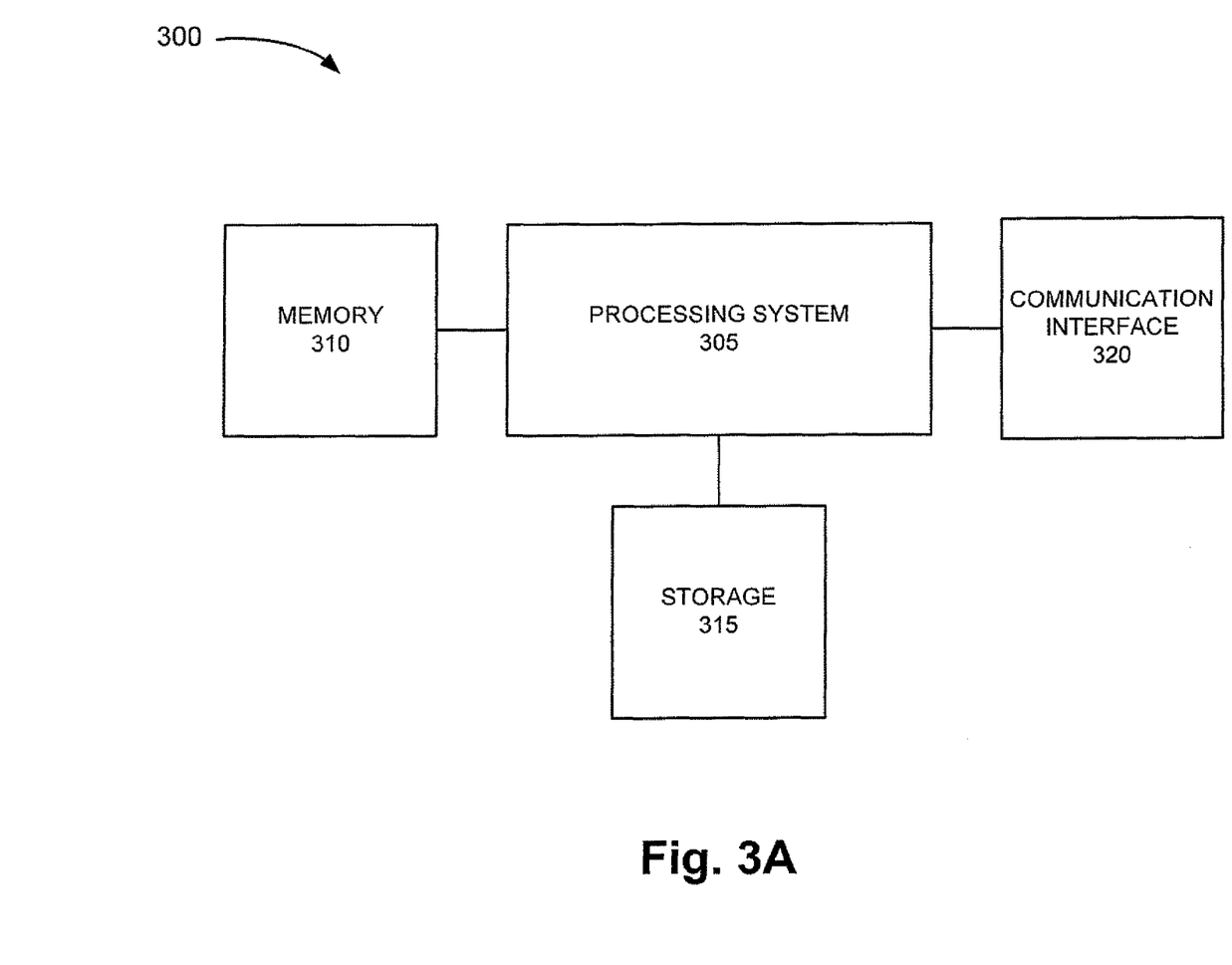
FIG. 3A is a diagram illustrating exemplary internal components of a device that may correspond to one or more network devices depicted in FIG. 2.

FIG. 3A is a diagram illustrating exemplary components of device 300 that may correspond to MMS gateway 220, SMS gateway 225, MMSC 230, SMSC 235, VASP-Aggregator 240, AP 245, and/or AS 250. As illustrated, device 300 may include a processing system 305, memory 310, storage 315, and a communication interface 320.

Processing system 305 may interpret and/or execute instructions and/or data. For example, processing system 305 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and/or execute instructions and/or data.

Memory 310 may store data, an application, and/or instructions related to the operation and use of device 300. For example, device 300 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 315 may store data, an application and/or instructions related to the operation and use of device 300. For example, storage 315 may include a hard disk (e.g., a magnetic disk, an optical disk, a magneto-optic disk, etc.) or another type of computer-readable medium, along with a corresponding drive. Memory 310 and/or storage 315 may also include a storing device external to and/or removable from device 300, such as a Universal Serial Bus (USB) memory stick, a hard disk, etc.

Communication interface 320 may enable device 300 to communicate with other components and/or systems. For example, communication interface 320 may include an Ethernet interface, an optical interface, a coaxial interface, a wireless interface, or the like that permit device 300 to communicate with other devices in environment 200.

Although FIG. 3A illustrates exemplary components of device 300, in other implementations, device 300 may include fewer, additional, and/or different components than those depicted in FIG. 3A.

Figure 3B:
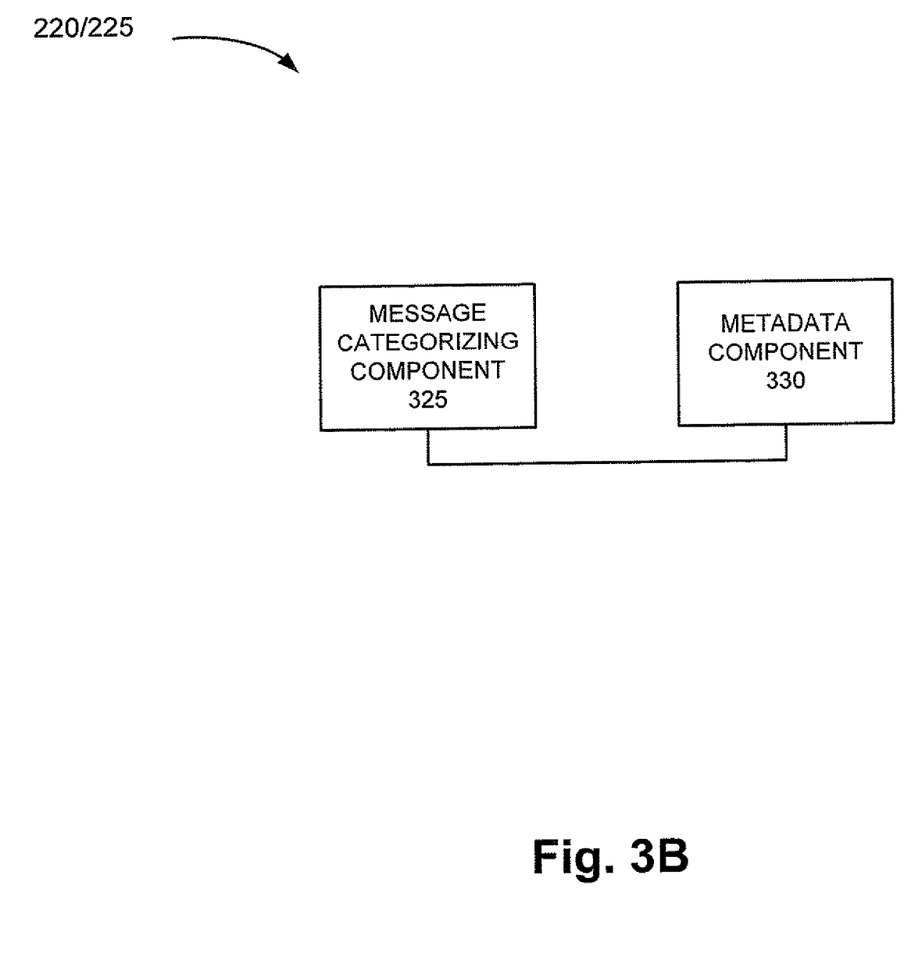
FIG. 3B is a diagram illustrating exemplary functional components of a network device depicted in FIG. 2 that may determine and generate metadata based on message characteristics.

FIG. 3B is a diagram illustrating exemplary functional components of a network device that may determine and generate metadata based on message characteristics. In one embodiment, one or more of the exemplary functional components may be implemented by software that is executed by processing system 305 of device 300. In other embodiments, one or more of the exemplary functional components may be implemented by firmware, hardware, and/or other some other type of logic. It will be appreciated that the functional components may be implemented in connection with a combination of components of device 300 and/or as an additional component(s) to those previously described in connection with device 300.

As illustrated, the functional components may include a message categorizing component 325 and a metadata component 330. In one embodiment, MMS gateway 220 and SMS gateway 225 may each include message categorizing component 325 and metadata component 330. However, in other embodiments, these exemplary functional components may exist in other devices of environment 200. For example, MMSC 230 and/or SMSC 235 may include one or more of the exemplary functional components.

Message categorizing component 325 may distinguish messaging traffic based on, for example, message source (e.g., an e-mail, a mobile directory number (MDN), a short code), message format, message originator (e.g., an application, a person), message recipient (e.g., an application, a person), message content, message application (e.g., news, financial, etc.), keywords, short codes, and/or other message characteristics (e.g., a broadcast message, a multicast message, etc.) associated with the message. Message categorizing component 325 may determine an importance and/or a user relevance of a message based on this type of information. For example, message categorizing component 325 may assign a level of importance and/or a level of user relevance, such as, for example, low, medium, high, default, emergency, urgent, special, normal, interactive, etc. In one embodiment, the importance and/or the user relevance of a message may correspond to a message priority level and/or a level of a message delivery alert. The message priority level may indicate a level of priority in which the message is to be delivered to an end user. For example, levels, such as emergency, urgent, normal, etc., may be utilized. The message may be handled by other network devices (e.g., MMSC 230 and SMSC 235) according to the particular message priority level. The message delivery alert level may indicate a level of alert for a received message (e.g., by user device 210).

Message categorizing component 325 may map a message priority level and/or a level of a message deliver alert based on one or multiple message characteristics. For example, the message priority for an application-based message may be determined based on its corresponding short code (e.g., a short string of numbers), which is commonly used by users to access an application. Message categorizing component 325 may map these short codes to particular message priority levels and/or levels of message delivery alert. For example, a short code corresponding to a coupon sending application may be mapped to a low message priority and/or be mapped to a low message delivery alert. Similar mappings may exist based on other message characteristics and/or combinations of message characteristics. For example, a message sent by a person and destined to the police may be mapped to a high, urgent, and/or emergency message priority level and/or be mapped to a high level for message delivery alert.

Metadata component 330 may generate metadata based on information from message categorizing component 325. The metadata may include information that indicates an importance to a message and/or a user relevance to a message. For example, for an SMS message and/or an MMS message, metadata component 330 may generate an alert on delivery parameter (ADP). The ADP may include a number of bits to indicate various levels of alert. For example, the ADP may be represented by two bits, where bit values of "00" indicate a default alert, bit values of "01" indicate a low priority alert, bit values of "10" indicate a medium priority alert, and bit values of "11" indicate a high priority alert. The metadata (i.e., the ADP) may be associated, attached, and/or included with SMS or MMS messages. In other embodiments, the ADP may include fewer or more bits and/or the bit values may indicate levels of alert that are different than described herein.

Additionally, metadata component 330 may generate a message priority parameter (MPP). The MPP may include a number of bits to indicate various levels of message priority. For example, the MPP may be represented by two bits, where bit values of "00" indicate a default message priority, bit values of "01" indicate a low message priority, bit values of "10" indicate a normal message priority, and bit values of "11" indicate a high message priority. The metadata (i.e., the MPP) may be associated, attached, and/or included with SMS or MMS messages. In other embodiments, the MPP may include fewer or more bits and/or the bit values may indicate levels of message priority that are different than described herein.

Although FIG. 3B illustrates exemplary functional components, in other implementations, device 300 may include additional, fewer, or different functional components. In still other implementations, one or more components of device 300 may perform one or more other tasks described as being performed by one or more other components of device 300. The connections between the functional components are exemplary.

Figure 4A:
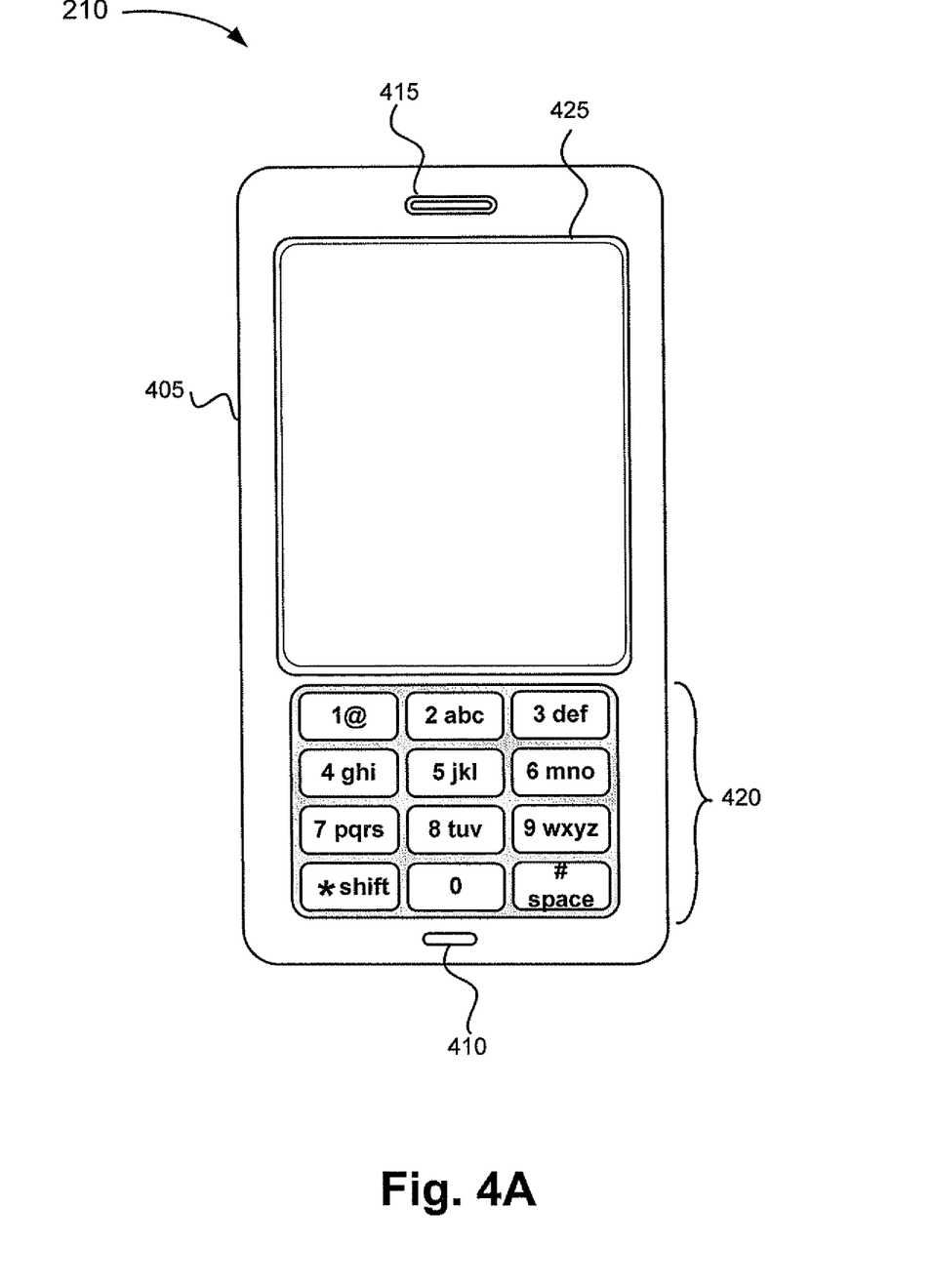
FIG. 4A is a diagram illustrating exemplary external components of a user device depicted in FIG. 2.

FIG. 4A is a diagram illustrating a front view of exemplary external components of user device 210. As illustrated, user device 210 may include a housing 405, a microphone 410, a speaker 415, a keypad 420, and a display 425.

Housing 405 may include a structure to contain components of user device 210. For example, housing 405 may be formed from plastic or metal and may support microphone 410, speaker 415, keypad 420, and display 425.

Microphone 410 may include a component capable of transducing a sound wave to corresponding electrical signals. For example, a user may speak into microphone 410 during a telephone call. Speaker 415 may include a component capable of transducing electrical signals to corresponding sound waves. For example, a user may listen to music or listen to a calling party through speaker 415.

Keypad 420 may include a component capable of providing input to user device 210. Keypad 420 may include a standard telephone keypad. Keypad 420 may also include one or more special purpose keys. In one implementation, each key of keypad 420 may be, for example, a pushbutton. A user may utilize keypad 320 for entering information, such as text or a phone number, or activating a special function.

Display 425 may include a component capable of providing visual information. For example, display 425 may include a liquid crystal display (LCD), a plasma display panel (PDP), a field emission display (FED), a thin film transistor (TFT) display, or some other type of display technology. Display 425 may display, for example, text, images, and/or video information to a user. Display 425 may include a touch screen.

Although FIG. 4A illustrates exemplary components, in other implementations, user device 210 may include additional, fewer, or different components.

Figure 4B:
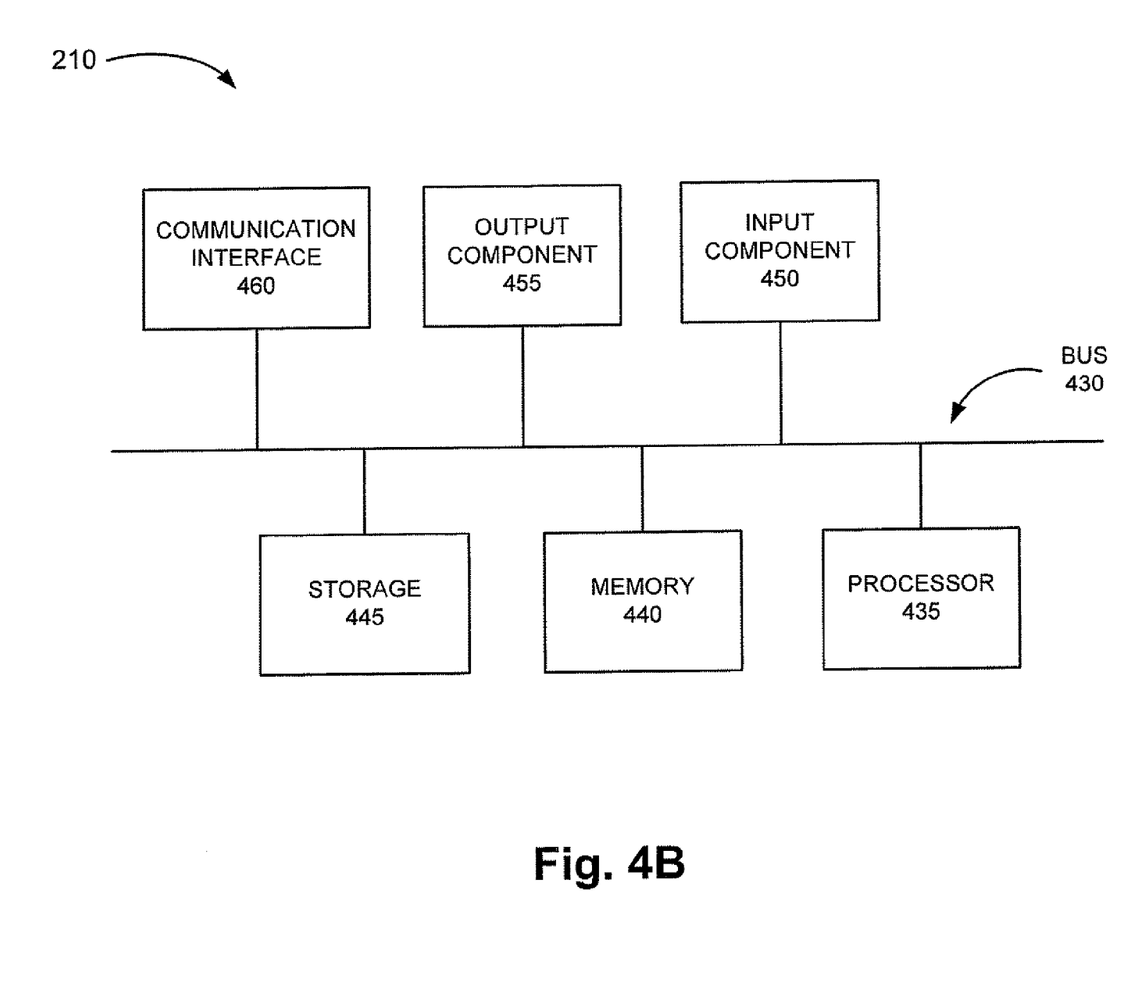
FIG. 4B is a diagram illustrating exemplary internal components of a user device depicted in FIG. 2.

FIG. 4B is a diagram illustrating exemplary internal components of user device 210. As illustrated, user device 210 may include a bus 430, a processor 435, a memory 440, storage 445, an input component 450, an output component 455, and a communication interface 460.

Bus 430 may include a path that permits communication among the components of user device 210. For example, bus 430 may include a system bus, an address bus, a data bus, and/or a control bus. Bus 430 may also include bus drivers, bus arbiters, bus interfaces, and/or clocks.

Processor 435 may interpret and/or execute instructions and/or data. For example, processor 435 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and/or execute instructions and/or data.

Memory 440 may store data, an application, and/or instructions related to the operation and use of user device 210. For example, memory 440 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 445 may store data, an application and/or instructions related to the operation and use of user device 210. For example, storage 445 may include a hard disk (e.g., a magnetic disk, an optical disk, a magneto-optic disk, etc.) or another type of computer-readable medium, along with a corresponding drive. The term "computer-readable medium" is intended to be broadly interpreted to include a physical or a logical memory device. It will be appreciated that memory 440 and/or storage 445 may include a storing device that may be external to and/or removable from user device 210, such as a Universal Serial Bus (USB) memory stick, a hard disk, etc.

Input component 450 may permit a user and/or another component to input information to user device 210. For example, input component 450 may include a keyboard, a keypad, a touch screen, a touchpad, a mouse, a button, a switch, a microphone, an input port, voice recognition logic, and/or some other type of visual, auditory and/or tactile-based input component. Output component 455 may output information to a user and/or another component. For example, output component 455 may include a display, a speaker, one or more light emitting diodes (LEDs), an output port, a vibrator, and/or some other type of visual, auditory, and/or tactile-based output component.

Communication interface 460 may enable user device 210 to communicate with other components and/or systems. For example, communication interface 460 may include an Ethernet interface, an optical interface, a coaxial interface, a wireless interface, or the like that permit user device 210 to communicate with other devices in environment 200.

Although FIG. 4B illustrates exemplary components, in other implementations, user device 210 may include additional, fewer, or different components.

Figure 4C:
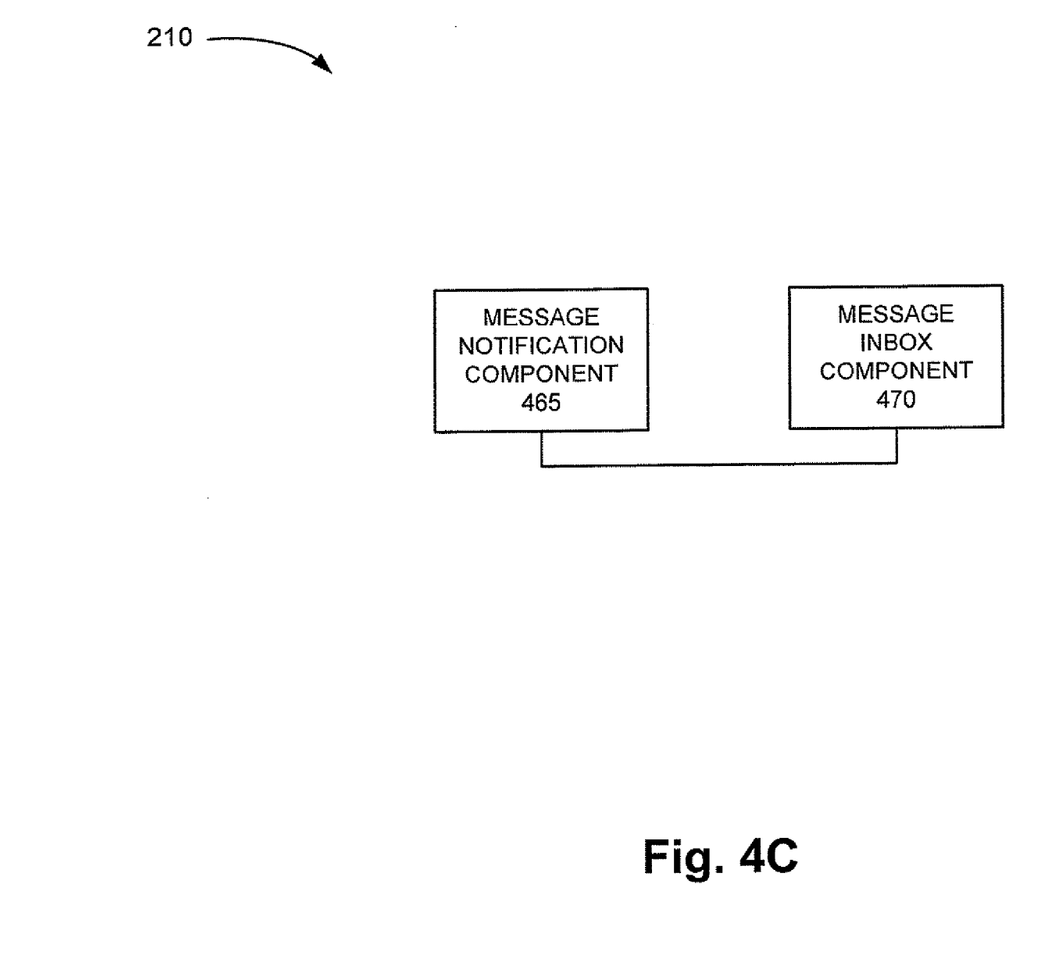
FIG. 4C is a diagram illustrating exemplary functional components of the exemplary user device depicted in FIG. 2 that may utilize metadata for managing received messages.

FIG. 3C is a diagram illustrating exemplary functional components of the exemplary user device that may utilize metadata for managing received messages. In one embodiment, one or more of the exemplary functional components may be implemented by software that is executed by processor 435 of user device 210. In other embodiments, one or more of the exemplary functional components may be implemented by firmware, hardware, and/or some other type of logic. It will be appreciated that the functional components may be implemented in connection with a combination of components of user device 210 and/or as an additional component(s) to those previously described in connection with user device 210. As illustrated, the functional components may include a message notification component 465 and a message inbox component 470.

In one embodiment, message notification component 465 and/or inbox component 370 may be included with a SMS client or a MMS client. In other embodiments, message notification component 465 and/or message inbox component 470 may be included with other applications, hardware, etc., residing in user device 210.

Message notification component 465 may determine an importance and/or a user relevance of a message received based on metadata attached, associated, and/or included with the message. Message notification component 465 may provide and/or cause to provide a notification (e.g., audible, visual, tactile) to a user corresponding to the importance and/or user relevance of the message. The notification provided to a user may be user-configured and/or based on default settings. It will be appreciated that a level of message delivery alert may be configured not to provide a notification. For example, a low level alert may not provide any audible, visual, and/or tactile notification to a user.

Message inbox component 470 may provide that a message may be stored in an inbox based on metadata associated with the message. Message inbox component 470 may allow a user to create multiple inbox folders, where each inbox folder corresponds to the importance and/or user relevance of a received message. Message inbox component 470 may also dynamically create an inbox folder. For example, user device 210 may not include an inbox folder corresponding to a particular level of importance and/or user relevance. In such instances, message inbox component 470 may automatically create an inbox folder that corresponds to the particular level of importance and/or user relevance when a message is received. Additionally, message inbox component 470 and/or user device 210 may allow a user to create inbox folders that correspond to particular levels of importance and/or user relevance.

Although FIG. 3C illustrates exemplary functional components, in other implementations, user device 210 may include additional, fewer, or different functional components. The connections between the functional components are exemplary.

Described below are exemplary processes for distinguishing between various messaging traffic and utilizing such information to determine an importance of a message and/or a user relevance of a message.

Figure 5:
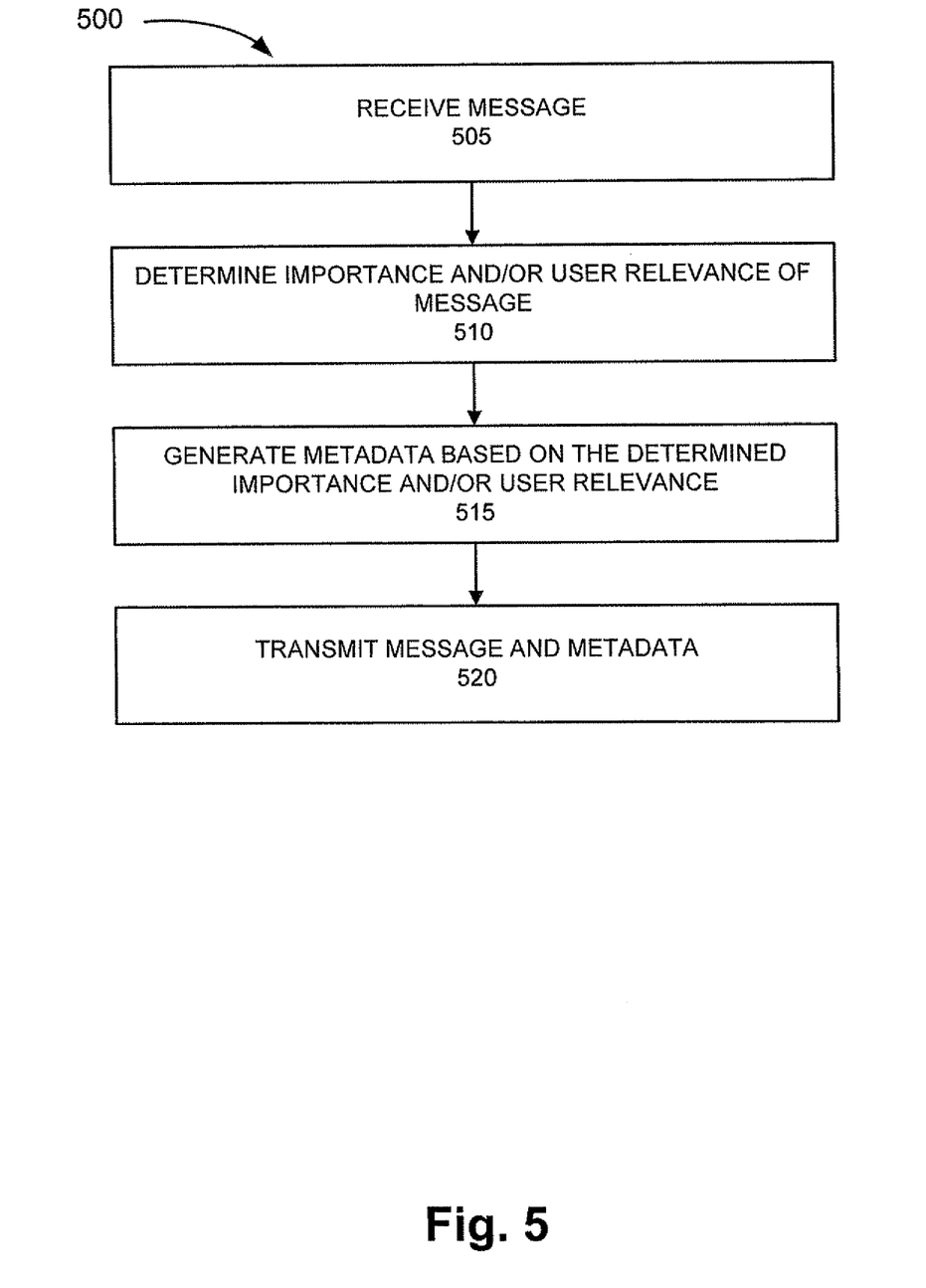
FIG. 5 is a flow diagram illustrating an exemplary process for determining and generating metadata based on message characteristics.

FIG. 5 is a flow diagram illustrating an exemplary process 500 for determining and generating metadata based on message characteristics. In addition to FIG. 5, process 500 may be described in reference to the previously described figures.

Process 500 will be described as being performed by MMS gateway 220 and SMS gateway 220. However, it will be appreciated that one or more operations for carrying out process 500 may be performed by a device other than MMS gateway 220 and SMS gateway 220. For example, MMSC 230 and SMSC 235 may perform one or more operations associated with process 500 and/or other operations associated with the concepts described herein.

Process 500 may begin with receiving a message (block 505). MMS gateway 220 or SMS gateway 225 may receive a message. The message may include a SMS message or a MMS message. In other instances, the message may include an e-mail. The SMS message, MMS message, or email may be from a user device or an application, and may be destined to another user device or application. For example, user 205-1 may send a SMS message, MMS message, or an e-mail to user 205-3 via network 215.

An importance and/or a user relevance of the message may be determined (block 510). MMS gateway 220 or SMS gateway 225 may determine the importance and/or user relevance of the message. Message categorizing component 325 may determine the importance and/or user relevance of the message based on, for example, message source, message format, message originator, message recipient, message content, message application, keywords, short codes, and/or other message characteristics associated with the message. As previously described, one or multiple message characteristics associated with a message may be mapped to a particular level of importance and/or user relevance. In one embodiment, the importance of a message may correspond to a message priority level. Additionally, in one embodiment, user relevance of a message may correspond to a message delivery alert level. Additionally, in one embodiment, it may be both.

Metadata may be generated based on the determined importance and/or user relevance (block 515). MMS gateway 220 or SMS gateway 225 may generate metadata. The metadata may include information relating to the importance and/or user relevance of the message. For example, metadata component 330 may generate metadata (e.g., an ADP and/or a MPP) based on information from message categorizing component 325.

The message and the metadata may be transmitted (block 520). MMS gateway 220 or SMS gateway 225 may transmit the message and the metadata toward a destination. For example, MMS gateway 220 or SMS gateway 225 may transmit the message and the metadata to MMSC 230 or SMSC 235, which in turn, may be forwarded to user 205-3 via user device 210-3.

Although FIG. 5 illustrates an exemplary process 500, in other implementations, fewer, additional, or different operations may be performed.

Figure 6:
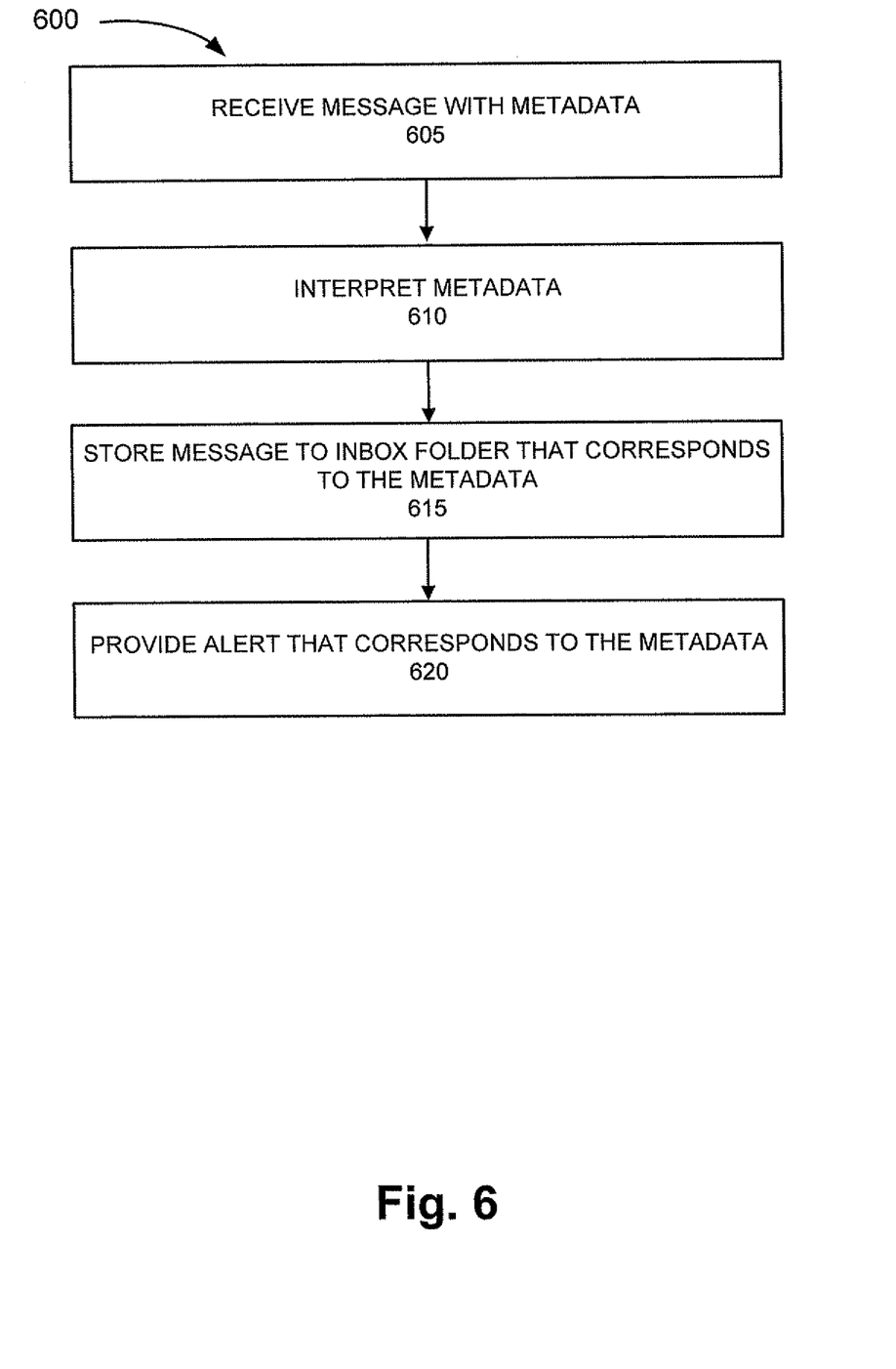
FIG. 6 is a flow diagram illustrating an exemplary process for utilizing the metadata generated in the exemplary process of FIG. 5 for managing received messages.

FIG. 6 is a flow diagram illustrating an exemplary process 600 for utilizing the metadata generated in process 500. In addition to FIG. 6, process 600 may be described in reference to the previously described figures. Process 600 will be described as being performed by a user device 210. For example, one or more operations of process 600 may be carried out by a SMS client or a MMS client.

Process 600 may begin by receiving a message with metadata (block 605). User device 210 may receive a message with metadata. The message with metadata may include a SMS message or a MMS message. For example, user device 210-3 may receive the message with the metadata from MMSC 230 or SMSC 235.

The metadata may be interpreted (block 610). User device 210 may interpret the metadata attached, associated, or included with the message. For example, the metadata may include an ADP and/or an MPP. The bit values of the ADP and/or the MPP may indicate the level of importance and/or user relevance of the message.

The message may be stored to an inbox folder that corresponds to the metadata (block 615). Message inbox component 470 may store the message in an inbox folder that corresponds to the metadata. As previously described, user device 210 may include multiple inbox folders, where the inbox folders may correspond to the importance and/or user relevance of a received message. In some cases, the inbox folders may be previously created by a user. In other cases, message inbox component 470 may dynamically create an inbox folder that corresponds to a particular level of importance and/or user relevance.

An alert that corresponds to the metadata may be provided (block 620). Message notification component 465 may provide or cause to provide a notification (e.g., audible, visual, tactile) to a user corresponding to the importance and/or user relevance of the received message. In some cases, the level of alert may not provide any notification. For example, as previously described, a low level alert may not provide any audible, visual, and/or tactile notification. The type of alert based on the importance and/or user relevance of the received message may be user-configured or based on a default-setting.

Although FIG. 6 illustrates an exemplary process 600, in other implementations, fewer, additional, or different operations may be performed.

Figure 7A:
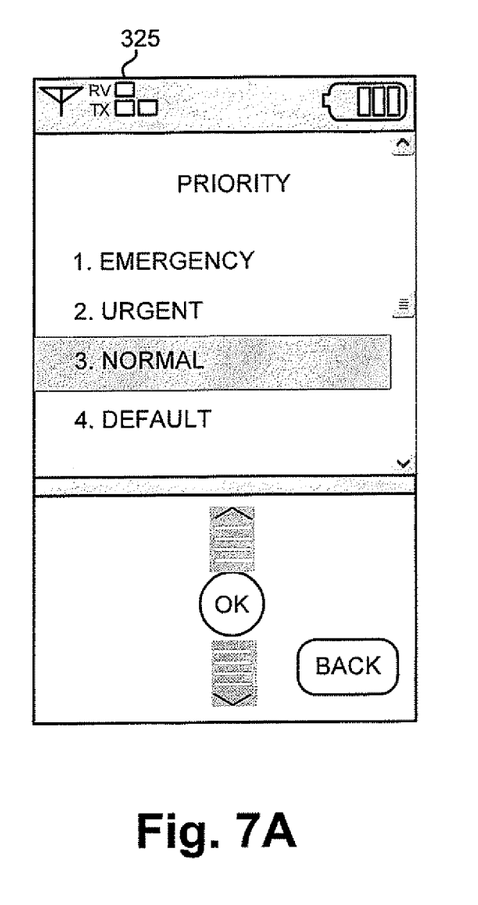
FIGS. 7A and 7B are diagrams illustrating exemplary user interfaces for managing messages received with metadata.
Figure 7B:
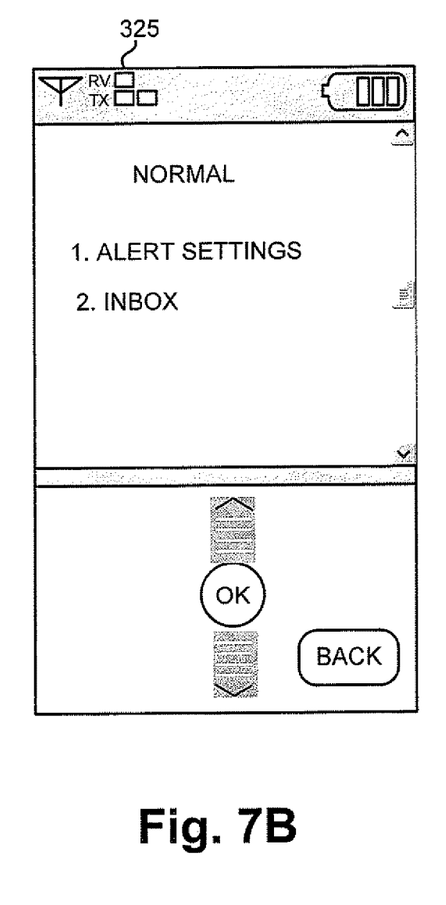

FIGS. 7A and 7B are diagrams illustrating exemplary user interfaces for managing messages received with metadata. As illustrated in FIG. 7A, user device 210 may display a user interface on display 425 to allow a user to configure various settings that may be used when a message with metadata is received. For example, the user interface may permit a user to select a message priority level from a list of priority levels, such as, for example, emergency, urgent, normal and default, so as to configure user device 210 when a message with a particular metadata is received. For example, the user may configure the message priority level of "normal" by selecting "normal" via the user interface. In a next screen, as illustrated in FIG. 7B, the user interface may allow a user to configure alert settings and message inbox for a selected message priority level, such as "normal." Although not illustrated, the user interface may permit a user to configure alerts (e.g., auditory, visual, tactile) for messages received having a normal message priority level. Depending on user device 210, there may be multiple auditory, visual, and/or tactile alerts to select from and/or combinations thereof. Additionally, although not illustrated, the user interface may permit a user to create an inbox folder to store messages received having a normal message priority level.

Although FIGS. 7A and 7B are exemplary user interfaces, in other implementations, the user interfaces may be different. Additionally, it will be appreciated that other types of user interfaces may be employed. For example, user interfaces that provide alert settings and/or inbox settings for particular message delivery alerts (e.g., based on the ADP).

According to the concepts described herein, various messaging traffic may be distinguished based on message characteristics associated with a message and metadata may be generated to indicate an importance and/or user relevance of the message. The metadata may be utilized for managing messages. For example, a user device may utilize the metadata to provide levels of message delivery alerts that are tailored to the importance and/or user relevance of the message. Additionally, a user device may provide multiple inbox folders that correspond to various levels of importance and/or user relevance of the message.

The foregoing description of implementations provides illustration, but is not intended to be exhaustive or to limit the implementations to the precise form disclosed.

The term "may" is used throughout this application and is intended to be interpreted, for example, as "having the potential to," "configured to," or "being able to", and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 5 and 6, the order of the blocks may be modified in other implementations. Further, non-dependent blocks may be performed in parallel.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method, comprising:
receiving, by a network device, a message, wherein the message includes one of a short message service message, a multimedia message service message, or an e-mail;
determining, by the network device, at least one of a message importance level or a message delivery alert level based on one or more message characteristics associated with the message;
including, by the network device, metadata that indicates the at least one of the message importance level or the message delivery level with the message based on the determining; and
transmitting, by the network device, the message and the metadata toward one or more user devices.

2. The method of claim 1, further comprising:
generating the metadata based on the determining.

3. The method of claim 1, wherein the one or more message characteristics associated with the message include at least one of message source, message format, message originator, message recipient, message content, message application, keyword, or short code.

4. The method of claim 1, further comprising:
receiving, by the one or more user devices, the message with the metadata;
interpreting the metadata; and
storing the message to an inbox folder that corresponds to the metadata.

5. The method of claim 4, wherein the storing further comprises dynamically creating the inbox folder when the inbox folder does not exist.

6. The method of claim 1, further comprising:
receiving, by the one or more user devices, the message with the metadata;
interpreting the metadata; and
providing an alert that corresponds to the metadata.

7. The method of claim 1, wherein the one or more message characteristics includes short codes, and the determining comprises mapping the short codes to the message importance level or the message delivery alert level.

8. The method of claim 1, wherein the method is performed by one of a short service message service gateway, a multimedia messaging service gateway, a short message service center, or a multimedia message service center.

9. A system comprising:
one or more components to:
receive one of a short message service message, a multimedia message service message, or an e-mail;
determine at least one of a message importance or a user relevance for the one of the short message service message, the multimedia message service message or the e-mail based on one or more message characteristics associated with the one of the short message service message, the multimedia message service message or the e-mail;
include metadata that indicates the at least one of the message importance or the user relevance; and
transmit the one of the short message service message, the multimedia message service message, or the e-mail and the metadata toward one or more user devices.

10. The system of claim 9, wherein the one or more message characteristics include at least one of message source, message format, message originator, message recipient, message content, message application, keyword, or short code.

11. The system of claim 9, wherein the user relevance corresponds to a message delivery alert.

12. The system of claim 9, wherein the metadata includes values for at least one of a message delivery alert level or a message priority level.

13. The system of claim 9, wherein the system is implemented in a short message service device or a multimedia message service device.

14. A system, comprising:
one or more components to:
receive a short message service message or a multimedia message service message;
inspect the short message service message or the multimedia message service message for metadata;
store the short message service message or the multimedia message service message in an inbox folder corresponding to the metadata based on the inspecting;
determine a level of alert corresponding to the metadata that indicates the short message service message or the multimedia message service message was received based on the inspecting; and
provide the determined level of alert.

15. The system of claim 14, where the system is implemented in a portable, mobile, or handheld user device.

16. The system of claim 14, wherein the one or more components are further configured to provide a user interface to permit a user to configure the level of alert that corresponds to the metadata.

17. A non-transitory, computer-readable medium containing instructions executable by a processor, the non-transitory, computer-readable medium storing one or more instructions for:
- receiving a message, wherein the message received includes one of a short message service message, a multimedia message service message, or an e-mail;
- determining at least one of a message importance level or a message delivery alert level based on a mapping of one or more message characteristics associated with the message;
- including metadata that indicates the at least one of the message importance level or the message delivery alert level with the message; and
- transmitting the message and the metadata to one or more user devices.

18. The non-transitory, computer-readable medium of claim 17, wherein the one or more message characteristics associated with the message include at least one of message source, message format, message originator, message recipient, message content, message application, keyword, or short code.

19. A non-transitory, computer-readable medium containing instructions executable by a processor, the non-transitory, computer-readable medium storing one or more instructions for:
- receiving one of a short message service message or a multimedia message service message with metadata;
- interpreting the metadata;
- providing a message delivery alert level that corresponds to the metadata based on the interpreting; and
- storing the one of the short message service message or the multimedia message service message in an inbox folder that corresponds to the metadata based on the interpreting.

20. The non-transitory, computer-readable medium of claim 19, wherein the metadata includes a message priority level.

* * * * *